(12) United States Patent  (10) Patent No.: US 9,579,715 B2
Marques et al.  (45) Date of Patent: Feb. 28, 2017

(54) DEVICE FOR HANDLING WAX SPIDER-LIKE SPRUES

(71) Applicant: SNECMA, Paris (FR)

(72) Inventors: François Marques, Bouffémont (FR); John Piat, Paris (FR); Monique Tirel, Saint Denis (FR)

(73) Assignee: SNECMA, Paris (FR)

( * ) Notice: Subject to any disclaimer, the term of this patent is extended or adjusted under 35 U.S.C. 154(b) by 105 days.

(21) Appl. No.: 14/400,714

(22) PCT Filed: May 14, 2013

(86) PCT No.: PCT/FR2013/051052
§ 371 (c)(1),
(2) Date: Nov. 12, 2014

(87) PCT Pub. No.: WO2013/171422
PCT Pub. Date: Nov. 21, 2013

(65) Prior Publication Data
US 2015/0174646 A1  Jun. 25, 2015

(30) Foreign Application Priority Data
May 14, 2012 (FR) ...................... 12 54362

(51) Int. Cl.
F16L 3/00 (2006.01)
B22C 23/00 (2006.01)
(Continued)

(52) U.S. Cl.
CPC ............... B22C 23/00 (2013.01); B22C 7/02 (2013.01); F16M 11/2007 (2013.01); B22C 9/04 (2013.01)

(58) Field of Classification Search
CPC .. B22C 23/00; B22C 7/02; B22C 9/04; F16M 11/2007
(Continued)

(56) References Cited

U.S. PATENT DOCUMENTS 3,939,898 A * 2/1976 Petro ......................... B22C 7/02
164/151.2
3,985,176 A * 10/1976 Wamester ................. B22C 9/04
164/45

(Continued)

FOREIGN PATENT DOCUMENTS

EP 2 052 799 A1 4/2009
FR 2 336 997 7/1977
(Continued)

OTHER PUBLICATIONS

International Search Report issued in International Application No. PCT/FR2013/051052, dated Jul. 2, 2013.

Primary Examiner — Christopher E Garft
(74) Attorney, Agent, or Firm — Pillsbury Winthrop Shaw Pittman LLP

(57) ABSTRACT

A device for handling spider-like sprues, includes a first support forming a first plane, the first support including a supporting device for supporting a wax spider-like sprue; a second support forming a second plane, the first support and the second support forming a first pre-determined angle ($\alpha 1$); a first connection system between the first support and the second support; a third support forming a third plane, the second support and the third support forming a second pre-determined angle ($\alpha 2$); and a second connection system between the second support and the third support.

13 Claims, 4 Drawing Sheets

Figure 1:
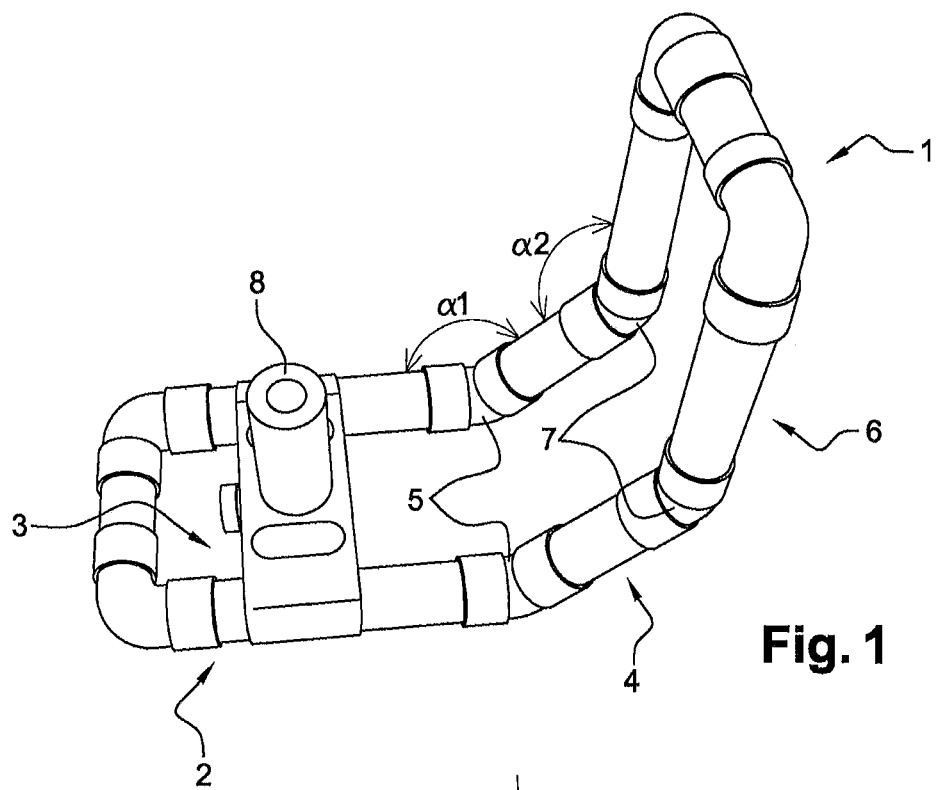

(51) Int. Cl.
  *B22C 7/02* (2006.01)
  *F16M 11/20* (2006.01)
  *B22C 9/04* (2006.01)

(58) Field of Classification Search
  USPC ................................. 248/121, 302, 309.1
  See application file for complete search history.

(56) References Cited

U.S. PATENT DOCUMENTS

| | | | | |
|---|---|---|---|---|
| 4,062,396 A | * | 12/1977 | Day | ................ B22C 23/00 164/15 |
| 5,044,419 A | * | 9/1991 | Ware | ................ B22C 7/02 164/34 |
| 6,349,758 B1 | * | 2/2002 | Bell | ................ B22C 7/02 164/235 |

FOREIGN PATENT DOCUMENTS

| | | |
|---|---|---|
| FR | 2 825 037 A1 | 11/2002 |
| JP | 03-000448 | 1/1991 |

* cited by examiner

DEVICE FOR HANDLING WAX
SPIDER-LIKE SPRUES

CROSS REFERENCE TO RELATED
APPLICATIONS

This application is the U.S. National Stage of PCT/FR2013/051052, filed May 14, 2013, which in turn claims priority to French Patent Application No. 1254362, filed May 14, 2012, the entire contents of all applications are incorporated herein by reference in their entireties.

The invention relates to a device for handling wax spider-like sprues. More particularly, said wax spider-like sprues are used in the aeronautical domain for the fabrication of moulds adapted to making blades.

A wax spider-like sprue is made by injection moulding of a plurality of parts, and the parts thus obtained are then assembled in spider-like sprues about an axis.

These wax spider-like sprues may for example be used for the fabrication of blades. This is done by firstly washing the wax spider-like sprues in a bath so as to clean all impurities from them, and then performing several dipping steps so as to form a ceramic shell.

A step to remove wax from the assembly formed by the wax spider-like sprue covered by a ceramic shell is then performed in the autoclave. This wax removal step melts the wax such that all that remains is the shell that forms a mould for the fabrication of blades.

A wax spider-like sprue usually weighs about 3.5 kilograms. Operators have to work standing up to handle the spider-like sprues due to the many assembly steps and the complexity and precision of these steps. The result is that operators suffer from severe posture constraints that frequently cause muscular-skeletal disorders.

In this context, the purpose of this invention is to provide a device for handling the wax spider-like sprues by which operators can handle the wax spider-like sprues during assembly without being suffering from severe postural constraints. This invention is also aimed at providing an inexpensive device for handling the wax spider-like sprues.

To achieve this, the invention discloses a device for handling wax spider-like sprues comprising:
  a first support forming a first plane, said first support comprising means of supporting a wax spider-like sprue;
  a second support forming a second plane, said first support and said second support forming a first determined angle;
  first connection means between said first support and said second support;
  a third support forming a third plane, said second support and said third support forming a second determined angle, and
  second connection means between said second support and said third support.

The device according to the invention may bear on the first support, on the second support or on the third support. Each of the supports forms a plane such that the device can bear on a table or on a workbench. The first connection means enable the device to tilt on the first support or the second support. Furthermore, the second connection means enable the device to tilt on the second support or the third support. Thus, the wax spider-like sprue can change from one position to the other without the operator needing to apply an excessive force because the weight of the spider-like sprue is supported by the device. In this respect, note that the third support also makes it possible to displace the centre of gravity of the assembly composed of the wax spider-like sprue and the device according to the invention such that the assembly is in an equilibrium position.

Advantageously, the three working positions facilitate assembly of the wax spider-like sprue and protect the assembler against muscular-skeletal disorders.

The device for handling the wax spider-like sprues according to the invention may also have one or several of the following characteristics, considered individually or in any technically possible combination.

In one non-limitative embodiment, the first connection means have a radius of curvature such that the device can tilt on the first support or on the second support.

In one non-limitative embodiment, the second connection means have a radius of curvature such that the device can tilt on the second support or on the third support.

In one non-limitative embodiment, the retaining means include an orifice into which the wax spider-like sprue hinge pin can fit.

In one non-limitative embodiment, the device according to the invention comprises a system for blocking the wax spider-like sprue in translation.

In one non-limitative embodiment, the translation blocking system consists of a projecting shoulder in the orifice adapted to cooperate with an external shoulder formed on the hinge pin of the wax spider-like sprue.

In one non-limitative embodiment, the device according to the invention comprises a system for blocking rotation of the wax spider-like sprue retaining means.

In one non-limitative embodiment, the rotation blocking system is a friction screw adapted to bear on the wax spider-like sprue retaining means.

In one non-limitative embodiment:
  the first support has a U-shaped tubular structure,
  the second support is formed from two tubes,
  the third support has a U-shaped tubular structure,
  the first connection means are formed from two tubular bends, each tubular bend cooperating:
    at a first end, with the end of a tube of the first support, and
    at a second end, with a first end of a tube of the second support;
  the second connection means are formed from two tubular bends, each tubular bend cooperating:
    at a first end, with a second end of a tube of the second support, and
    at a second end, with the end of a tube of the third support.

In one non-limitative embodiment, the first determined angle is between 20 and 70 degrees and is preferably 45 degrees.

In one non-limitative embodiment, the second determined angle is between 20 and 70 degrees and is preferably 45 degrees.

Figure 2:
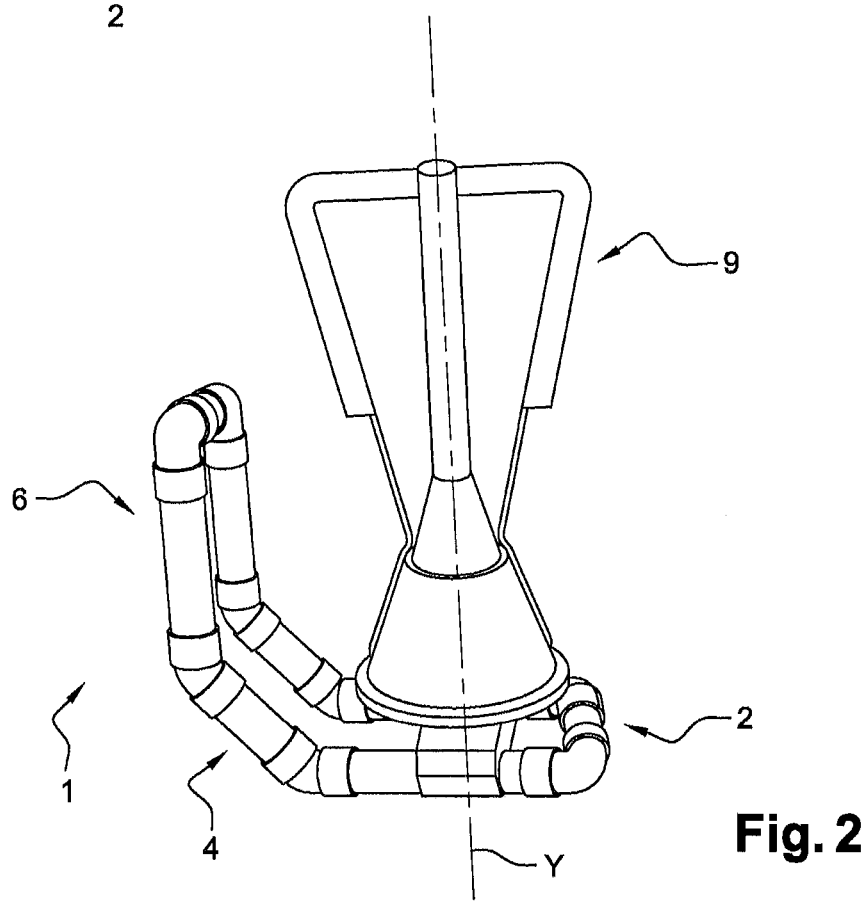
Figure 3:
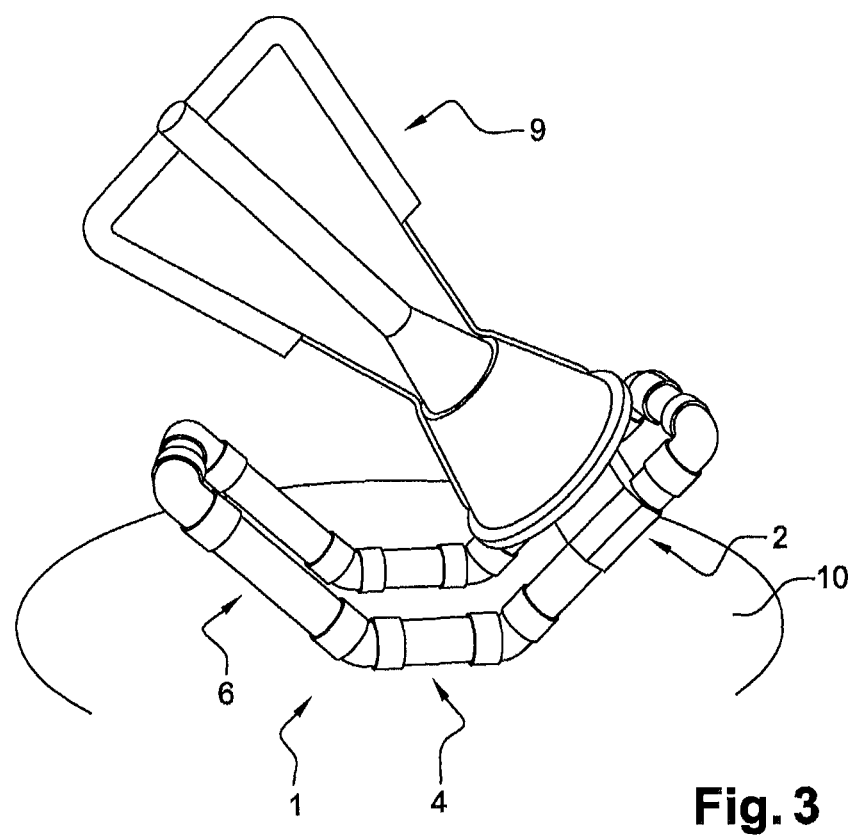
Figure 4:
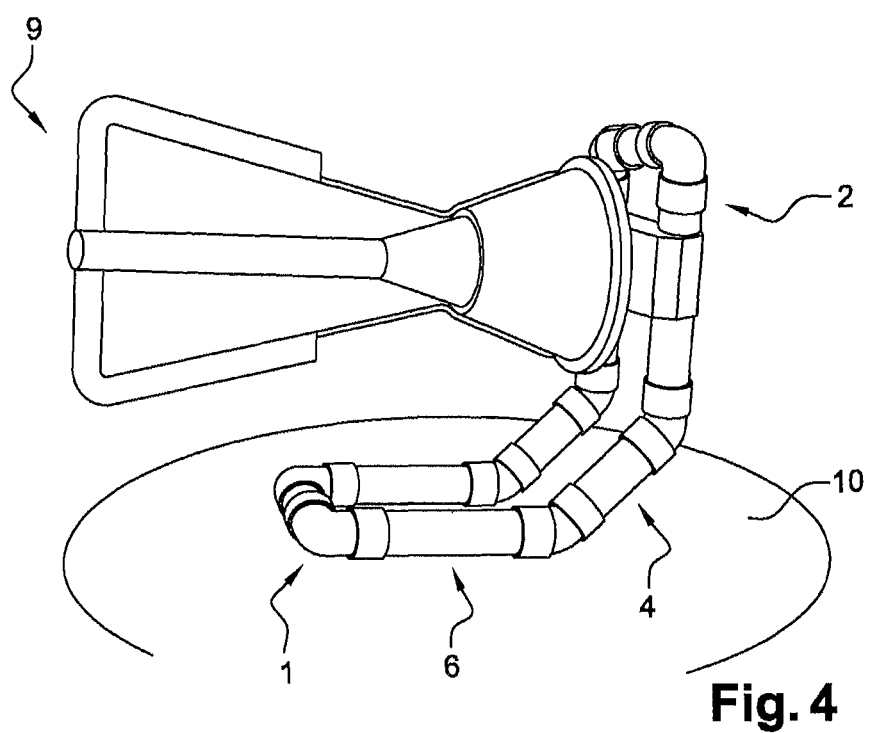
Figure 5:
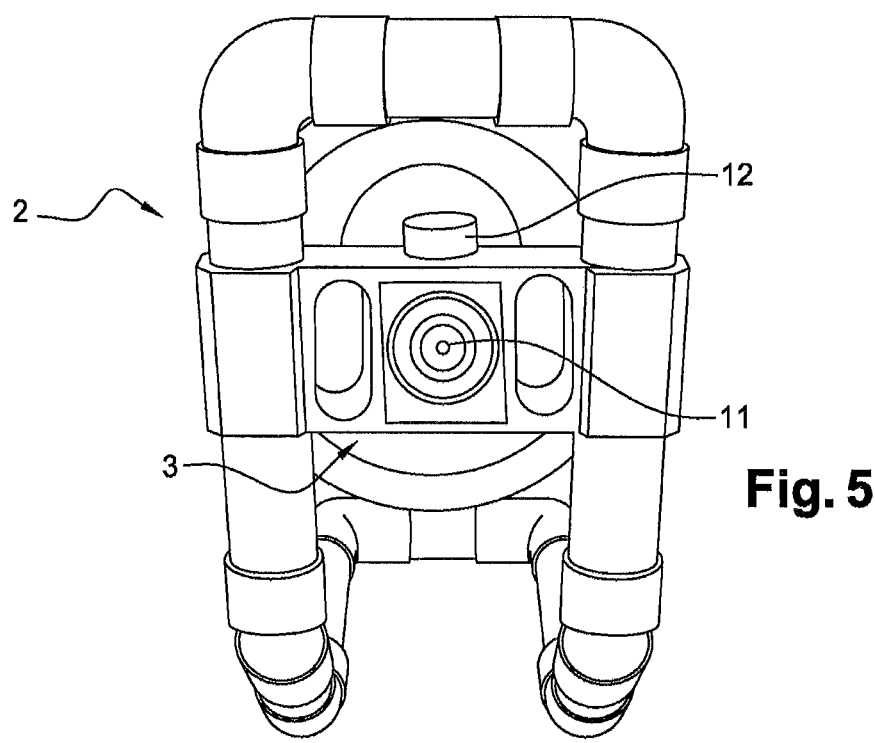
Figure 6:
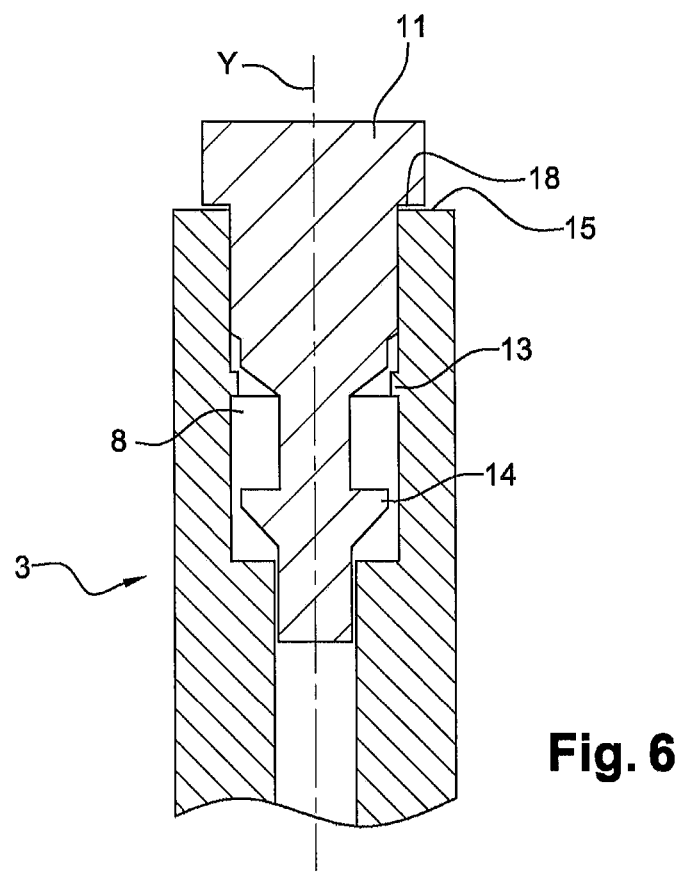
Figure 7:
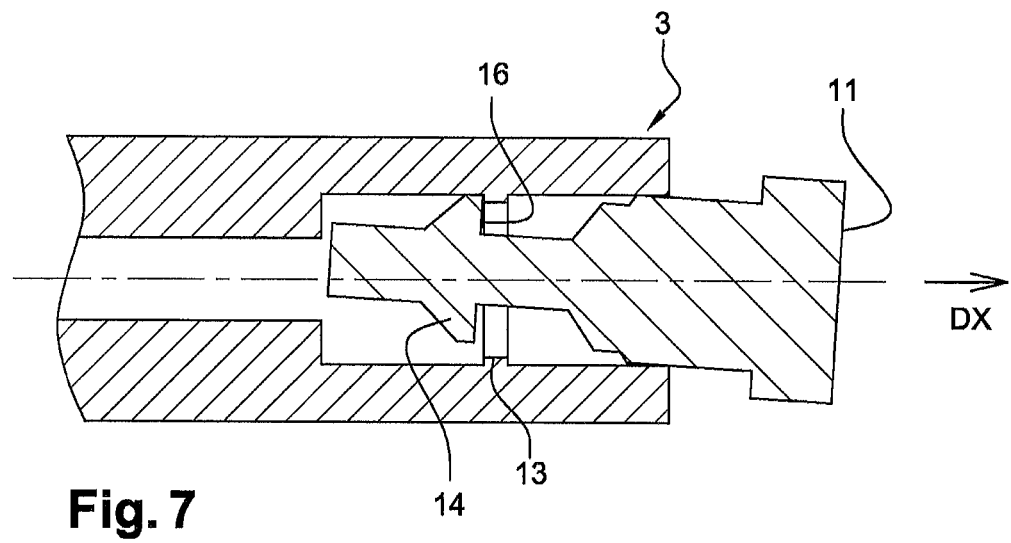
Figure 8:
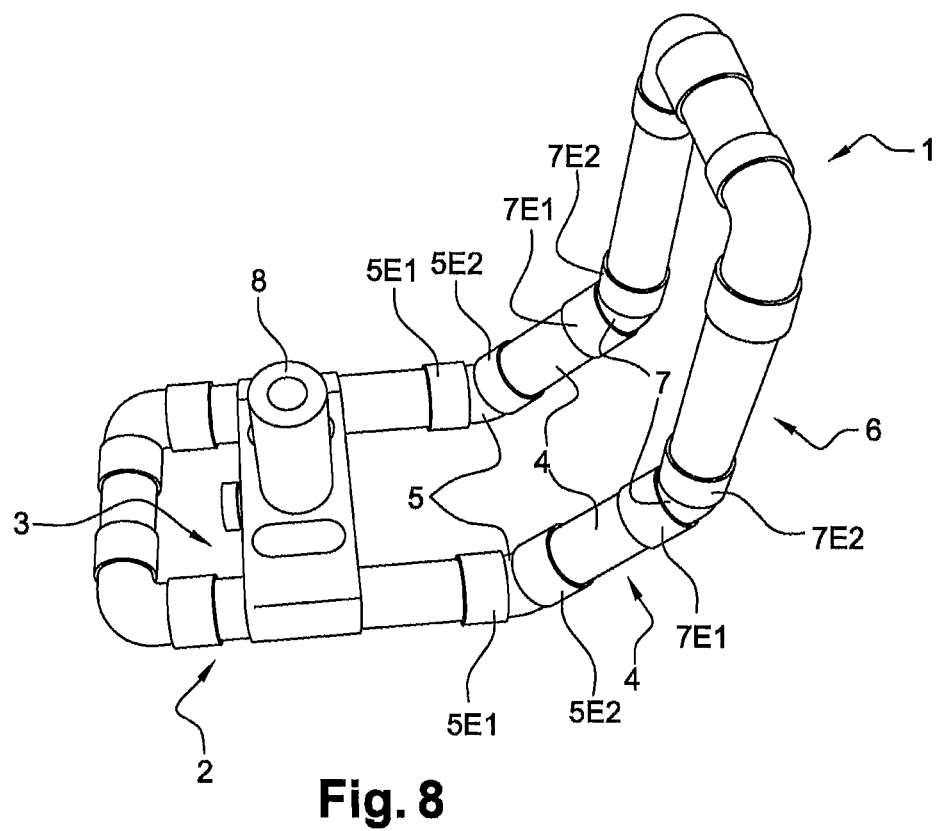

Other characteristics and advantages of the invention will become clear from the description given below for information and that is in no way limitative, with reference to the appended figures, among which:

FIG. 1 shows a non-limitative example embodiment of a device for handling wax spider-like sprues according to the invention, FIGS. 2, 3 and 4 show three positioning examples of the device according to the invention shown in FIG. 1, FIG. 5 is a bottom view of the device according to the invention shown in FIG. 1, FIGS. 6 and 7 show a translation blocking system included in the device according to the invention, and FIG. 8 shows an example embodiment of the structure of a device conforming with the invention.

Common elements in all figures have the same reference numbers.

FIG. 1 shows a non-limitative example embodiment of a device 1 for handling wax spider-like sprues according to the invention. The device 1 comprises:
- a first support 2 forming a first plane, the first support 2 comprising means 3 of retaining a wax spider-like sprue;
- a second support 4 forming a second plane, the first support 2 and the second support 4 forming a first determined angle α1;
- first connection means 5 between the first support 2 and the second support 4, the first connection means 5 having a radius of curvature such that the device 1 can tilt on the first support 2 or the second support 4;
- a third support 6 forming a third plane, the second support 4 and the third support 6 forming a second determined angle α2;
- second connection means 7 between the second support 4 and the third support 6, the second connection means 7 having a radius of curvature such that the device 1 can tilt on the second support 4 or the third support 6.

The first support 2, the second support 4 and the third support 6 are formed from PVC tubes in this example.

Furthermore, the first connection means 5 and the second connection means 7 are formed from PVC tube bends. The radii of the bends are such that the device can tilt in three positions smoothly and without difficulty. Thus, the device 1 may be tilted in three stable positions:
- a first position in which the device 1 is supported on the first support 2;
- a second position in which the device 1 is supported on the second support 4;
- a third position in which the device 1 is supported on the third support 6.

When the device 1 is tilted on the first or second connection means 5 or 7, these connection means form support points and make the device 1 stable while facilitating displacement of the device 1 on the table because all the supports are at points and not entire surfaces.

In this embodiment shown in FIG. 1, the first determined angle α1 is 45 degrees and the second angle α2 is 45 degrees. It is obvious that the angles could be different without going outside the scope of the invention.

It should be noted that the retaining means 3 of a wax spider-like sprue have an orifice 8 into which the hinge pin of the wax spider-like sprue will fit. This will be disclosed in detail later.

FIGS. 2, 3 and 4 show the device 1 conforming with that shown in FIG. 1, the device 1 being provided with a wax spider-like sprue 9.

In FIG. 2, the device 1 is supported on the first support 2 such that the wax spider-like sprue 9 is in an approximately vertical position such that the operator can construct the spider-like sprue using the different wax and ceramic elements. It should be noted also that the spider-like sprue 9 can pivot on itself about a vertical axis Y.

As shown in FIG. 3, during assembly, the operator can tilt the device 1 on the second support 4 such that the wax spider-like sprue 9 is tilted relative to the table 10 on which the device 1 is placed. In this position, the spider-like sprue 9 can also pivot on itself.

A shown in FIG. 4, the operator can tilt the device 1 on the third support 6 such that the wax spider-like sprue 9 is in a horizontal position (i.e. approximately parallel to the table 10). In this horizontal position, the spider-like sprue 9 can also pivot on itself.

FIG. 5 shows a bottom view of the first support 2. This FIG. 2 more particularly shows the retaining means 3 and the end of the hinge pin 11 of the spider-like sprue 9 that is inserted in the orifice of the retaining means 3. In this non-limitative embodiment, the device 1 comprises a rotation blocking system 12 for the retaining means 3 of the wax spider-like sprue 9. This blocking system 12 consists of a friction screw adapted to bear on the retaining means 3 of the wax spider-like sprue 9. This friction screw blocks and releases the rotation movement of the retaining means 3. The rotation movement of the spider-like sprue about its hinge pin 11 in the orifice 8 of the retaining means 3 is still possible but it is limited by the friction action of the hinge pin 11 in the orifice 8.

FIGS. 6 and 7 show a translation blocking system of the wax spider-like sprue relative to the device according to the invention. In this non-limitative embodiment, the translation blocking system 13 consists of a shoulder that projects in the orifice 8. The shoulder 13 is adapted to cooperate with an external shoulder 14 formed on the end of the hinge pin 11 of the wax spider-like sprue 9.

More particularly, in FIG. 6, the retaining means 3 are vertically in position and the end of the hinge pin 11 of the wax spider-like sprue 9 is placed in the orifice 8 of the retaining means 3. In the lowest position, the shoulder 18 of the hinge pin 11 is in contact with the upper surface 15 of the retaining means 3. The spider-like sprue can thus be pivoted about itself by rotating it about the Y axis of the orifice 8. No rotation blocking system is shown in this embodiment. Obviously, a rotation blocking system could be used to block rotation of the retaining means 3 about the Y axis.

When the device 1 is positioned on the second support 4, the shoulder 18 of the hinge pin 11 is also in contact with the upper surface 15 of the retaining means 3 such that the wax spider-like sprue cannot escape.

When the device 1 is positioned on the third support 6, the wax spider-like sprue is in the horizontal position (i.e. parallel to the table on which the device 1 is supported). Thus, the risk that the wax spider-like sprue will escape from the retaining means 3 is avoided due to the shoulder 13 formed on the orifice 8. When the hinge pin 11 is pulled along a direction Dx, in other words towards the outside of the retaining means 3, the hinge pin becomes cantilevered. The surface 16 of the shoulder 14 of the hinge pin 11 then comes into contact with the shoulder 13 of the orifice 8. This contact prevents extraction of the hinge pin 11 and therefore the wax spider-like sprue.

All that is necessary to eliminate this blockage is to position the device 1 on the first support 2 once again. Since the hinge pin 11 is no longer cantilevered in this position, the operator can easily extract the hinge pin 11 from the orifice 8 without being prevented by the translation blocking means 13.

FIG. 8 shows an example embodiment of the first support 2, the second support 4 and the third support 6. The three supports may for example be made of PVC. According to this embodiment:
- the first support 2 has a U-shaped tubular structure,
- the second support 4 is formed from two tubes,
- the third support 6 has a U-shaped tubular structure,
- the first connection means 5 are composed of two tubular bends, each tubular bend cooperating:
  - at a first end 5E1, with the end of a tube of the first support 2, and at a second end 5E2, with a first end of a tube of the second support 4, the second connection means 7 are composed of two tubular bends, each tubular bend cooperating:

at a first end 7E1, with the second end of a tube of the second support, and at a second end 7E2, with the end of a tube of the third support 6.

Such a structure of the device 1 according to the invention forms an ergonomic tool that is inexpensive to make. The tubular structure of the assembly has no aggressive surface and the PVC material from which the tubes are made is not cold for handling.

In general, such a device for handling wax spider-like sprues:

limits the development of muscular-skeletal disorders due to the reduction of postural constraints, can be used by right handed or left handed persons;

is lightweight, solid and does not require any particular maintenance.

Furthermore, the first support, the second support, the third support, the first connection means and the second connection means enable easy effortless handling of the wax spider-like sprue.

The device for handling wax spider-like sprues according to the invention has been disclosed with reference to a tubular structure, but obviously the first, second and third supports could be composed of plates without going outside the scope of the invention.

The invention claimed is:

1. A device for handling wax spider-like sprues, comprising:
a first support lying in a first plane, said first support comprising a supporting device to support a wax spider-like sprue;
a second support lying in a second plane, said first support and said second support forming a first determined angle $\alpha 1$;
a first connection system between said first support and said second support;
a third support lying in a third plane, said second support and said third support forming a second determined angle $\alpha 2$, and
a second connection system between said second support and said third support,
wherein the first determined angle $\alpha 1$ and the second determined angle $\alpha 2$ are selected so that the first and third planes are nonparallel to each other.

2. The device according to claim 1, wherein:
the first connection system has a radius of curvature such that the device can tilt on the first support or on the second support, and
the second connection system has a radius of curvature such that the device can tilt on the second support or on the third support.

3. The device according to claim 1, wherein the supporting device includes an orifice into which a hinge pin of the wax spider-like sprue can fit.

4. The device according to claim 3, comprising a translation blocking system for blocking the wax spider-like sprue in translation.

5. The device according to claim 4, wherein the translation blocking system consists of a projecting shoulder in the orifice adapted to cooperate with an external shoulder formed on the hinge pin of the wax spider-like sprue.

6. A device for handling wax spider-like sprues, comprising:
a first support lying in a first plane, said first support comprising a supporting device to support a wax spider-like sprue;
a second support lying in a second plane, said first support and said second support forming a first determined angle $\alpha 1$;
a first connection system between said first support and said second support;
a third support lying in a third plane, said second support and said third support forming a second determined angle $\alpha 2$,
a second connection system between said second support and said third support, and
a rotation blocking system for blocking rotation of the supporting device of the wax spider-like sprue.

7. The device according to claim 6, wherein the rotation blocking system is a friction screw adapted to bear on the supporting device of the wax spider-like sprue.

8. The device according to claim 1, wherein:
the first support has a U-shaped tubular structure,
the second support is formed from two tubes,
the third support has a U-shaped tubular structure,
the first connection system is formed from two tubular bends, each tubular bend cooperating:
at a first end with an end of a tube of the first support, and
at a second end with a first end of a tube of the second support;
the second connection system is formed from two tubular bends, each tubular bend cooperating:
at a first end, with a second end of a tube of the second support, and
at a second end, with the end of a tube of the third support.

9. A device for handling wax spider-like sprues, comprising:
a first support lying in a first plane, said first support comprising a supporting device to support a wax spider-like sprue;
a second support lying in a second plane, said first support and said second support forming a first determined angle $\alpha 1$;
a first connection system between said first support and said second support;
a third support lying in a third plane, said second support and said third support forming a second determined angle $\alpha 2$, and
a second connection system between said second support and said third support,
wherein the first determined angle $\alpha 1$ is between 20 and 70 degrees.

10. A device for handling wax spider-like sprues, comprising:
a first support lying in a first plane, said first support comprising a supporting device to support a wax spider-like sprue;
a second support lying in a second plane, said first support and said second support forming a first determined angle $\alpha 1$;
a first connection system between said first support and said second support;
a third support lying in a third plane, said second support and said third support forming a second determined angle $\alpha 2$, and
a second connection system between said second support and said third support, wherein the second determined angle α2 is between 20 and 70 degrees.

11. The device according to claim 9, wherein the first determined angle is 45 degrees.

12. The device according to claim 10, wherein the second determined angle is 45 degrees.

13. The device according to claim 1, wherein the supporting device is connected to a first and a second member of the first support, the first and second members separated by, and connected to, a third member of the first support so that the first, second and third members lie in the first plane.

* * * * *